July 6, 1943.　　　C. W. BAIRD　　　2,323,441
ELECTRICAL SYSTEM
Filed April 25, 1942
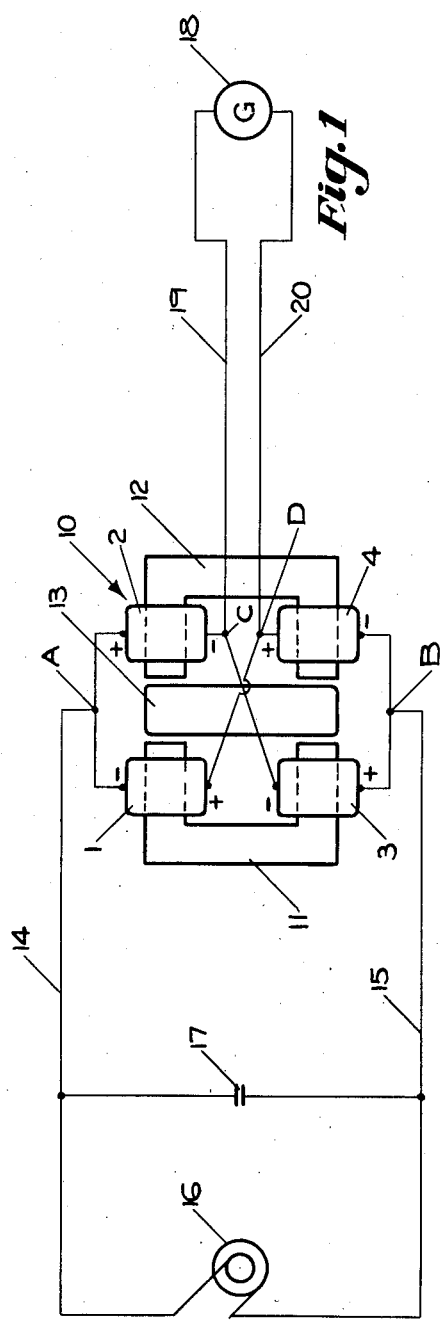
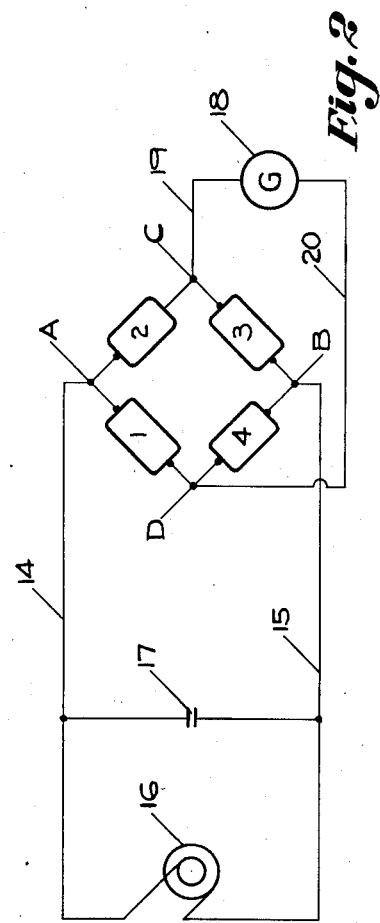
INVENTOR:
CLYDE W. BAIRD,
By Chas. M. Nissen,
ATT'Y.

Patented July 6, 1943

2,323,441

UNITED STATES PATENT OFFICE 2,323,441

ELECTRICAL SYSTEM

Clyde W. Baird, Columbus, Ohio, assignor to The Traylor Vibrator Company, a corporation of Colorado Application April 25, 1942, Serial No. 440,509

3 Claims. (Cl. 172—240)

This invention relates to an electrical system including particularly an electro-magnetic vibratory motor the energizing field coils of which are connected in a particular manner.

An object of the invention is to provide an electrical system of the above mentioned type so that the coils, such as the field coils, are energized by both direct and alternating current flowing therethrough, the circuits being such that the direct current does not flow in the main alternating current lines, or, in other words, through the source of alternating current, and preferably also, the alternating current does not flow through the direct current main lines or through the source of direct current.

Other objects of the invention will appear hereinafter, the novel features and combinations being set forth in the appended claims.

In the accompanying drawing,

Fig. 1 is a wiring diagram of the electrical system of my invention; and

Fig. 2 is a simplified diagram of the electrical circuit alone, ignoring the physical relation of the coils and the associated cores and armature.

Referring particularly to Fig. 1 of the drawing, 10 designates an electro-magnetic vibratory motor which in general may embody the structure disclosed for example in the patent to John A. Traylor, No. 1,772,596, dated August 12, 1930, as illustrated in Figs. 6 and 7 of the drawings, except that it preferably, though not necessarily, omits the winding or coil from the vibrating armature.

Briefly described, said motor 10 includes a pair of U-shaped field cores 11 and 12, preferably made of stacked laminations, which field cores are rigidly attached to a main frame of the motor, not shown. Positioned between said cores 11 and 12 is an armature 13 preferably made of stacked laminations of magnetic material and preferably resiliently mounted for vibratory movement first toward the core 11 and then toward the other core 12 under the combined influence of the alternating or undulating and direct currents, as hereinafter described more fully.

One leg of the core 11 is provided with an energizing coil 1, while the other leg thereof is provided with an energizing coil 3. One leg of the core 12 is provided with an energizing coil 2 and the other leg thereof is provided with an energizing coil 4. As clearly illustrated in Fig. 1 of the drawing, coils 1 and 2 are on aligned legs of cores 11 and 12, respectively, and coils 3 and 4 are on the other aligned legs of said cores. It may be noted by reference to Fig. 2 of the drawing, which shows only the electrical circuit without any attempt to show the physical relation of the coils, that said coils 1, 2, 3 and 4 form a Wheatstone bridge with the coils in sequence around the bridge starting with coil 1. By tracing the electrical circuits as shown in Fig. 1, it will be seen that they correspond with those of Fig. 2. The electrical circuits will now be described and they apply equally to Figs. 1 and 2.

Conductors 14 and 15 are the main conductors, or lines, which extend from a source of alternating current illustrated at 16, preferably the usual public utility source. Connected across this main source of alternating current 16, not necessarily but preferably, is provided a condenser 17 to improve the power factor of the motor 10. Conductor 14 leads to terminal A and conductor 15 leads to terminal B. It is evident that between terminals A and B there are two parallel branch circuits, one including coils 1 and 4 in series, the other including coils 2 and 3 in series. In other words, conductor 14 is connected to the common treminals of coils 1 and 2 and conductor 15 is connected to the common terminals of coils 3 and 4 and coils 1 and 4 are connected in series across conductors 14 and 15 and coils 2 and 3 are connected in series across conductors 14 and 15. It is thus evident that all four coils, 1, 2, 3 and 4, are energized by way of main lines or conductors 14 and 15 from the source of alternating current 16. In order to produce vibratory motion in the armature 13 and at a frequency equal to the frequency of the undulating or alternating current produced by generator 16, said coils 1, 2, 3 and 4 are also energized from a source of direct current 18 by way of a direct current circuit including the main lines or conductors 19 and 20. Conductor 19 is connected to terminal C and conductor 20 is connected to terminal D. Terminal C is the terminal which is common with the coils 2 and 3 and terminal D is the terminal which is common with the coils 1 and 4. It is evident that each of the conductors 19 and 20 is connected to each coil 1, 2, 3 and 4, at the opposite terminal thereof from that to which a conductor 14 or 15 is connected.

Referring particularly to Fig. 2 of the drawing, it will be evident that the source of direct current is applied to the Wheatstone bridge arrangement of the coils 1, 2, 3 and 4 at diametrically opposite terminals and the same applies with the connection of the source of alternating current to said coils, the points of connection, however, being removed from each other by an interposed coil. The coils 1, 2, 3 and 4 are preferably identical or at least have the same electrical characteristics as to impedance. It is therefore evident that the direct current in flowing through coils 1, 2, 3 and 4 will produce a substantially zero direct current voltage drop between terminals A and B due to the Wheatstone bridge arrangement and consequently there will be no tendency for direct current to flow through the conductors or mains 14 and 15 or through the source of alternating current 16. This is extremely desirable because direct current flowing through alternating apparatus frequently tends to saturate it, particularly if any transformers are employed as they may be, and said direct current frequently tends to overload alternate current apparatus. Likewise the alternate current flowing through said coils 1, 2, 3 and 4 will produce no alternating current voltage drop between terminals C and D and consequently there will be no alternate current flowing through conductors 19 or 20 or generator 18. This is also a desirable factor.

In the operation of the system, the motor 10 has its field coils 1, 2, 3 and 4 energized simultaneously by both alternating or undulating current and direct current flowing therethrough. These coils are so poled that the armature 13 will be attracted first toward the core 11 and then toward the core 12 which will continue cyclically at a frequency determined by the frequency of the source 16 and the alternating and direct currents will be confined to separate main paths thereby producing maximum efficiency.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. An electrical system including a vibratory electro-magnetic motor having a pair of oppositely positioned field cores and a common armature between them adapted to be moved periodically first toward one of said cores and then toward the other, a pair of windings on each core, a circuit for energizing said coils from a source of undulating current including connections whereby said four windings are connected in two parallel branches across the undulating current source, each branch including two coils in series, said series coils being on opposite field cores, a second circuit for energizing said coils from a source of direct current whereby said four windings are connected in two parallel branches across the direct current source, each branch including two coils in series, said series coils being on opposite field cores, the point of connection of the direct current source to any coil being at the opposite terminal thereof as its point of connection to the undulating current source.

2. An electrical system including a vibratory motor having a pair of oppositely positioned cores, a pair of substantially identical coils on each core, the coils on one core being designated for identification as coils one and three, and the coils on the other core being designated as coils two and four, said four coils being connected in a Wheatstone bridge circuit in numerical sequence, circuit means for energizing said coils from a source of undulating current with opposite lines thereof connected across terminals common to coils one and two and coils three and four, respectively, and circuit means for energizing said coils from a source of direct current with opposite lines thereof connected across terminals common to conductors one and four and coils two and three, respectively.

3. An electrical system including a vibratory motor having a pair of oppositely positioned cores, a pair of coils on each core, the coils on one core being designated for identification as coils one and three, and the coils on the other core being designated as coils two and four, said four coils being connected in a Wheatstone bridge circuit in numerical sequence, circuit means for energizing said coils from a source of undulating current with opposite lines thereof across terminals common to coils one and two and coils three and four, respectively, and circuit means for energizing said coils from a source of direct current with opposite lines thereof connected across terminals common to conductors one and four and coils two and three, respectively.

CLYDE W. BAIRD.

CERTIFICATE OF CORRECTION.

Patent No. 2,323,441.                                              July 6, 1943.

CLYDE W. BAIRD.

It is hereby certified that error appears in the printed specification of the above numbered patent requiring correction as follows: Page 2, second column, line 42, claim 3, before "across" insert --connected--; and that the said Letters Patent should be read with this correction therein that the same may conform to the record of the case in the Patent Office.

Signed and sealed this 25th day of April, A. D. 1944.

Leslie Frazer

(Seal)                                              Acting Commissioner of Patents.